No. 718,717. PATENTED JAN. 20, 1903.
F. MARX & E. MÉREI.
APPARATUS FOR RECEIVING AND COLLECTING MAIL.
APPLICATION FILED JUNE 23, 1902.
NO MODEL. 3 SHEETS—SHEET 1.
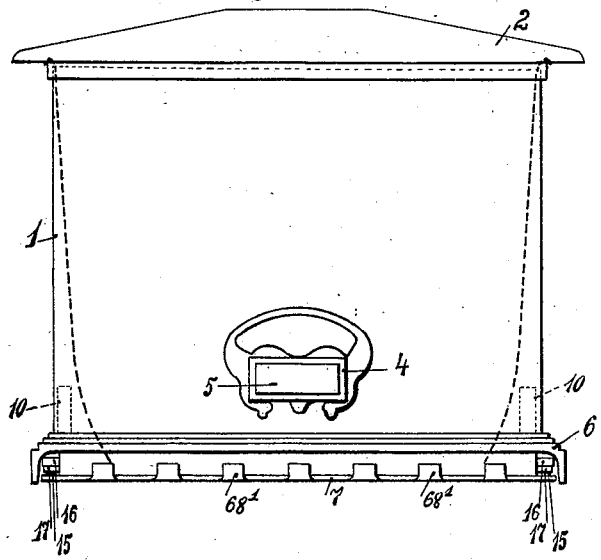
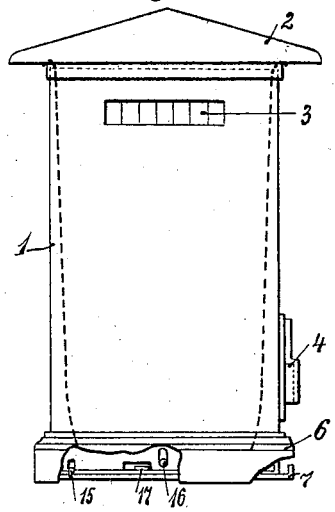
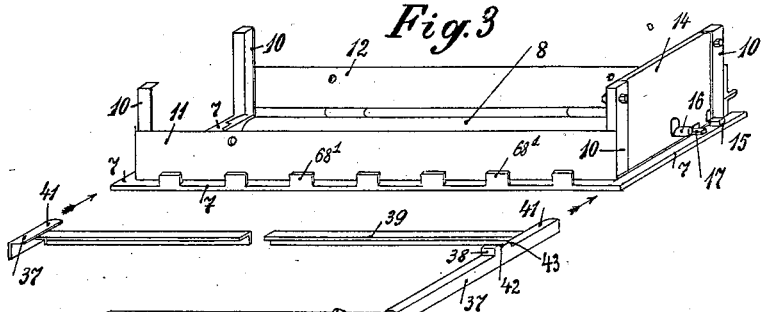
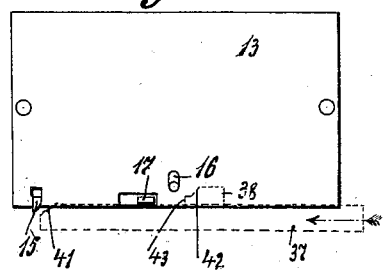
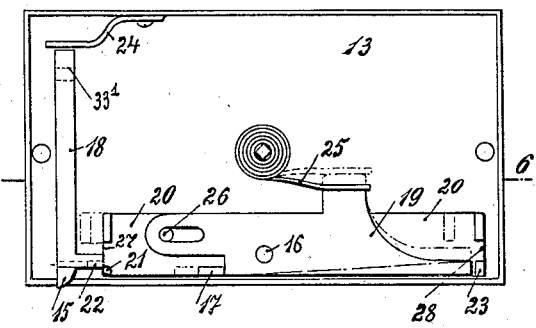
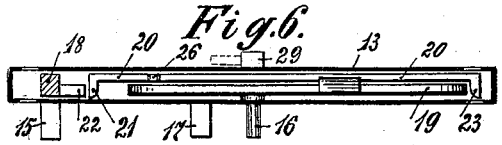

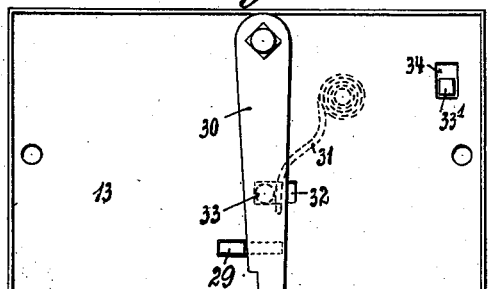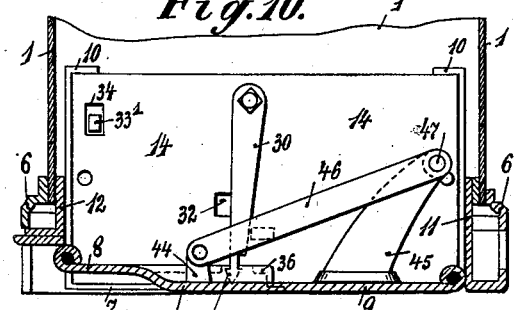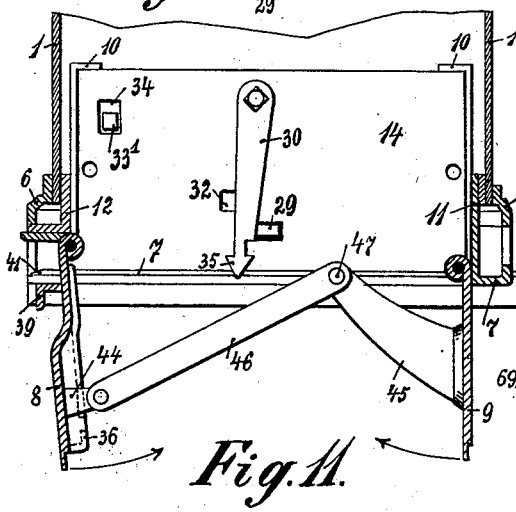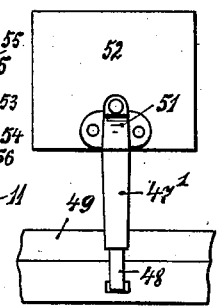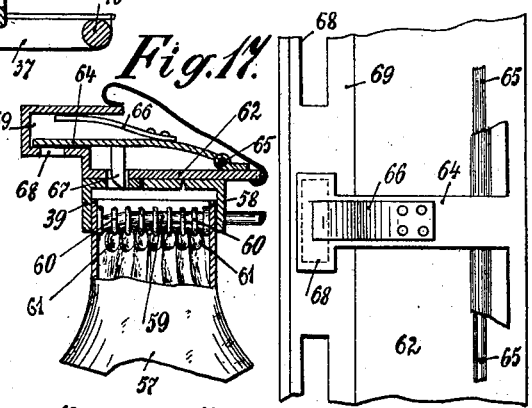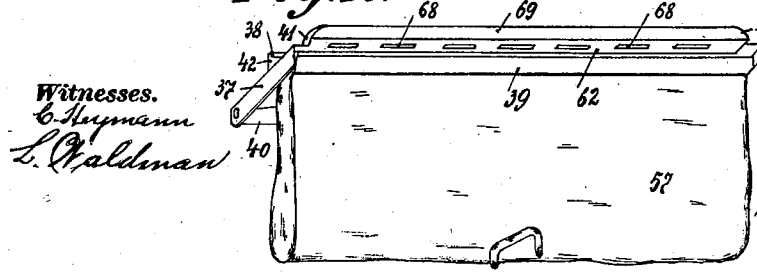

No. 718,717. PATENTED JAN. 20, 1903.
F. MARX & E. MÉREI.
APPARATUS FOR RECEIVING AND COLLECTING MAIL.
APPLICATION FILED JUNE 23, 1902.
NO MODEL. 3 SHEETS—SHEET 3.
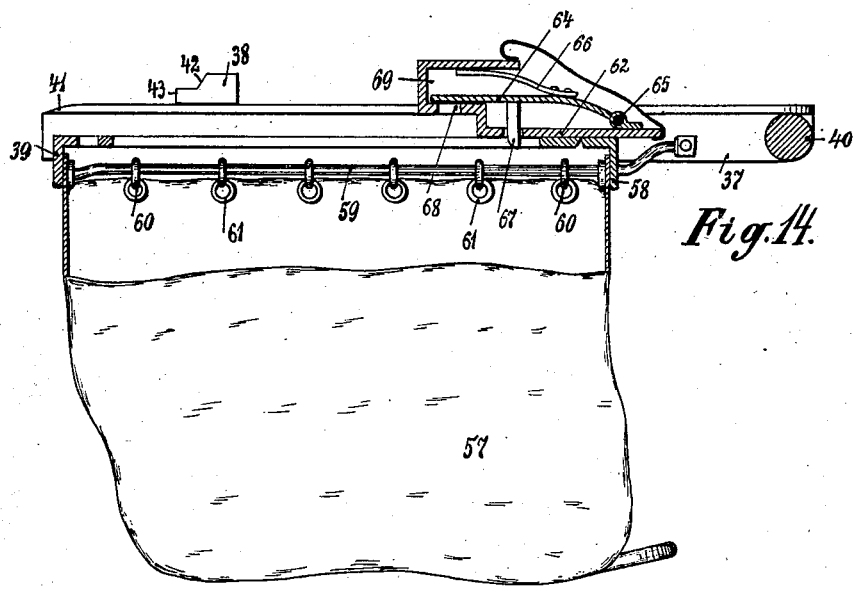
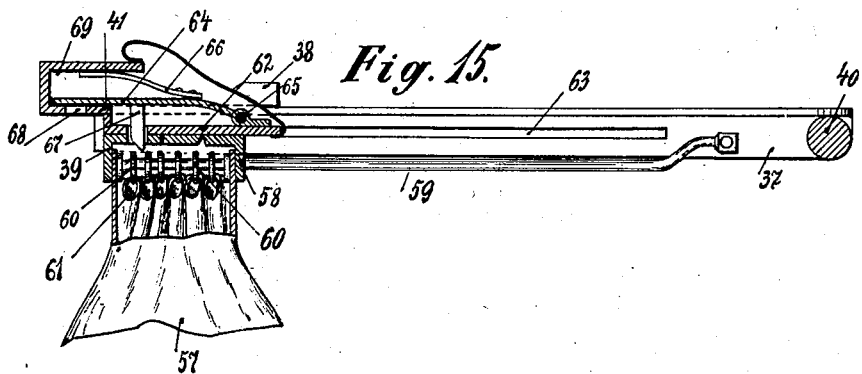
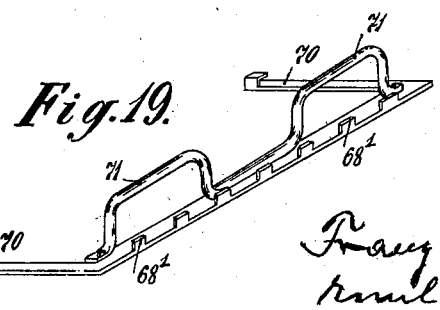

UNITED STATES PATENT OFFICE.

FRANZ MARX AND EMIL MÉREI, OF BUDAPEST, AUSTRIA-HUNGARY.

APPARATUS FOR RECEIVING AND COLLECTING MAIL.

SPECIFICATION forming part of Letters Patent No. 718,717, dated January 20, 1903.

Application filed June 23, 1902. Serial No. 112,821. (No model.)

*To all whom it may concern:*

Be it known that we, FRANZ MARX and EMIL MÉREI, manufacturers, of VI Aradi-utcza 60, Budapest, Austria-Hungary, have invented Apparatus for Receiving and Collecting Mail, of which the following is a specification.

The present invention relates to a letter box or receptacle of such kind that it can only be emptied when a letter-collecting bag is attached to it, whereby the lock of the box is opened. Upon attaching the closed collecting-bag it is automatically opened, so as to receive the letters, which drop down through the open bottom, after which it is closed simultaneously with the letter-box.

The object of this arrangement is to prevent unauthorized persons from emptying the box and also to render the letters inaccessible even to the postman, as the box as well as the collecting-bag open only when in a certain position with regard to each other. To this end the collecting-bag is carried by a frame which forms the key for the box, while the two opposite walls of the bag are attached to rails or bars movably arranged with regard to each other, being, however, normally closed and only released by the contact of or in combination with the letter-box by means of appropriate devices to that end.
The bottom of the letter-box is connected with a device which is adapted to prevent the time-card arranged on the outside of the box for indicating the time of discharge from being removed or exchanged while the box is locked.

The invention is illustrated in the accompanying drawings, in which—

Figure 1 is a front view of the letter-box. Fig. 2 is a side view of the same with the base partly broken away. Fig. 3 is a perspective view of the lower part of the box and of a part of the frame of the collecting-bag used for the opening of the letter-box, one of the laterally-arranged detachable locking devices of the box not being shown. Fig. 4 is an outer view of one of the detachable locking devices. Fig. 5 is an internal view of the same with the front plate removed. Fig. 6 shows a horizontal section of the lock-casing on the line 6 6 of Fig. 5. Fig. 7 is a perspective view of part of the locking device. Fig. 8 is the lock looked at from the interior of the box. Fig. 9 is a top view of Fig. 8. Fig. 10 is a vertical cross-section of part of the box with the bottom shown in locked position. Fig. 11 is a cross-section of the box in its open position and with the "key" inserted. Fig. 12 is a sectional detail showing a device for locking or receiving the time-card. Fig. 13 is a view of Fig. 12 from the left-hand side; Fig. 14, a longitudinal section of the collecting-bag in opened position. Fig. 15 is a section of the bag in closed position. Fig. 16 is a perspective view of the closed bag; Fig. 17, a vertical cross-section of the top of the collecting-bag. Fig. 18 is an enlarged detail, in top plan view, of part of the same, showing an element of the bag-lock; and Fig. 19 is a perspective view of the key for the opening of the bag-lock and which is kept at the post-office.

As can be seen from Figs. 1 and 2, the letter-box consists of a casing 1 with a cover 2, of sheet metal, the cover being so connected with the casing that the detachment of these parts is only possible from the interior. The cover 2 is preferably roof-shaped, sloping downward on all four sides and projecting beyond the vertical walls of the casing 1 in order to insure a safe running off of rain. The casing 1 is provided on the outside with the usual slot 3 for the introduction of the letters and a frame 4 for the reception of the time-card checks 5. Around the lower part of the casing 1 is a flange or skirting 6, which on the narrow side of the box extends slightly deeper than on the long sides of the same in order to protect the lock, hereinafter described, against rain and to conceal it from the eyes of the public.

The lower part of the casing 1 contains a bottom piece, Fig. 3, which is so secured in the casing 1 that it can be detached only when the casing is opened from the interior of the box. This bottom piece consists of a horizontal frame 7, Figs. 1, 2, 3, 10, 11, and 12, adapted to receive the halves 8 and 9 of the bottom, which are hinged to the frame 7. Moreover, the frame 7 is provided with four vertical corner-posts 10, Fig. 3, of angular cross-section, the posts being connected in pairs on the long sides of the box by plates 11 or angle-iron 12. The posts 10 are arranged to receive the locking-plates 13 and 14, which are connected to the posts by screws, so as to allow of an easy detachment for repairing or other purposes. These locking devices 13 14 are arranged as casings, through slots in which on both sides of the bottom piece project three lugs 15 16 17, Figs. 2, 3, 4, 5, 6, 9. These lugs belong, respectively, to three portions of the three parts of the lock 18 19 20, Figs. 5 and 6, arranged in the interior of the casing. Of these parts the part 18 (also shown in Fig. 7) is a safety device, the part 19 being the detent and the part 20 the locking bolt or plate. In normal position, Fig. 5, the locking-bolt 20 is locked by the lug 22 of the part 18 bearing against its projection or flange end 21, as well as by the detent 19 bearing against the projection or flange end 23 at its other end. However, as soon as the locking-bar 18 is raised against the action of its spring 24 and the detent 19 is turned in upward direction about its fixed pivot 26 against the action of the spring 25 the projection 22 on the locking-bar 18 comes opposite a slot or recess 27 in the flange 21 and the other end of the detent 19 coincides with a slot 28 in the flange 23 of the locking-bolt 20, so that the latter can move freely to the left, Fig. 5, as shown in dotted lines. On the side of the casing adjacent to the bolt 20 is a projection 29 from said bolt, Figs. 6, 8, 9, 11, which projects outwardly through a longitudinal slot in the casing. This projection 29 bears against a pawl 30, rotatably pivoted on the wall of the casing and constantly pressed by a spring 31, Fig. 8, arranged in the interior of the lock-casing, against the projections 29 of the locking-bolt 20. The locking-pawl 30 is provided with a pin 33, projecting through a slot 32 in the lock-casing and acted upon by the spring 31. The locking-bar 18 is provided with a lug 33', Fig. 7, serving as a guide for the locking member in a slot 34 in the lock-casing, Figs. 8, 9, 10, 11. The locking-pawl 30 is at its lower end provided with a hook 35, which engages with a corresponding hook 36 on one of the bottom halves 8, Figs. 10, 11, thereby holding the latter, as well as the overlapping second bottom half 9, supported by it, in raised, and therefore locked, position.

As already mentioned, the frame of the collecting-bag serves for the opening of the bottom of the receptacle. However, in order to open the letter-box for inspection, repair, or the like a key is provided, as shown in perspective view in Fig. 3. This key is entirely like the frame of the collecting-bag, and the only difference is the suppression of the bag and of the locking device.

The key, Fig. 3, consists of two parallel bars 37 of angular cross-section, which are provided with projections 38 and at their rear ends connected by a bar 39 and at the front end by a handle 40. The distance between the two bars corresponds precisely to the width of the frame 7 of the bottom piece, so that the bars 37 can be slipped onto the frame 7, the bar 39 then passing beneath the plate 7 and insuring an exact guidance, Fig. 11. The free ends of both bars 37 are beveled at 41, as can be seen from Figs. 3, 4, 11, 14, 15, 16. On advancing the key first the beveled end 41 of the bars 37 move beneath the projecting tumbler-lugs 15 of the locking members 18, which, owing to their gravity, bear upon the plate 7 and lift the said lugs, whereupon, as already mentioned, the projections 22, Figs. 5 and 6, come opposite the slots 27, so that the displacement of the locking-bolts 20 in the manner described and the opening of the bottom half 9 are now only opposed by the ends of the detents 19 and the flanges 23. If now the bars 37 are further advanced, the curved or inclined parts 42 of the projections 38 coöperate with the round pins or tumbler-lugs 16 of the detents 19 and turn the latter into the position indicated in dotted lines in Fig. 5, so that the displacement of the locking-bolt 20 can take place through the pushing contact of the shoulders 43 of projections 38 with the throwing-lugs 17 and a rotation of the locking-pawls 30, and thereby the opening of the bottom halves will be effected by means of the projections 29.

The bottom parts 8 9 are connected to the frame 7 or to the sides 11 12 by hinges. The closing of the box is effected upon the withdrawal of the key by its bar 39, which, as shown in Fig. 11, slides under and lifts the bottom part 8. Both bottom parts 8 9 are connected at one or both ends, immediately adjacent to the lock-casings 13 14, by a hinged connection, whereby upon raising the rear part 8 by the bar 39 of the key the front part 9 is also lifted. This hinged connection consists of two standards 44 and 45, rigidly connected to the leaves 8 and 9, respectively, and a link 46, connecting the ends of these arms. The arm 45 carries at its inner end a laterally-projecting lug 47, which on the dropping of the part 8 9 engages a corresponding projection on the frame 7, thereby preventing the connection 45 46 from being extended into a straight line or folding downward, so as not to prevent the closing of the box.

The device which prevents the check-card 5, Fig. 12, from being removed from the box or exchanged when the box is closed is shown in Figs. 12 and 13. It consists of an obliquely-arranged rod 47', which is supported by its lower end 48 resting upon the bottom part 9. The shouldered lower end 48 of this rod extends through a convenient opening in a sheet-metal plate 49, which covers the hinge of the bottom part 9 along the whole length of the lower part of the box. At its upper end this rod 47' carries a pawl or finger 50, which projects through an opening in the casing 1. For the guidance of the finger 50 during the up and down motion of the rod 47' a guide 51 is arranged on a plate 52, secured to the inner side of the wall of the box 1. In the closed position of the box, Fig. 12, the finger 50 presses and holds the check-card 5 in the lower part of the frame 4, thereby preventing the latter from being removed. The check-card is provided on its outside with two elevations 53 and beneath the latter with a projection 54 in the opposite direction. The finger 50 engages in the closed position of the box with this internal projection 54 of the card, and thereby presses the outer projections 53 against the upper edge of the lower part of the frame 4. When, however, the bottom parts 8 9 are opened in the described manner, the end 48 of the rod 47 drops in the opening on the plate 49 and the finger 50 releases the check-card 5. Now in order to prevent the card from falling down through the open frame 4 a resilient plate 55 is flexibly secured in the interior of the frame 4 and presses the released card 5 against the inner edge of the frame. The plate 55 has a slot for the finger 50 and is provided at the bottom with a spring 56, adapted to depress the plate 55 for the purpose of withdrawing the check-card 5, which, as described, can only be effected in the open position of the box.

The collecting-bag 57, Figs. 14 to 18, consists of a frame which corresponds exactly to that shown in Fig. 3 and already described, with the sole difference that the bar 39 is riveted or otherwise secured to one of the broad sides of the bag 57. The opposite broad side of the bag 57 is attached to a second bar 58, which can move on two round rods 59, secured to the parallel bars 37. These round rods carry rings 60, from which are suspended by eyelets 61 or other suitable device the narrow sides of the bag. The bag 57 is secured to a plate 62, which is movable in grooves 63 in the bars 37 and carries the closing device of the bag. The closing device consists of a series of plates 64, which are arranged pivotally and independently on a rigid rod 65 and pressed in downward direction by springs 66, Fig. 18. The plates 64 carry pins 67, which engage in corresponding holes in the bar 39, and thus prevent the opening of the collecting-bag. When, however, the plates 64, carrying the pins 67, are raised against their springs 66 by means of pins or projections introduced through the openings 68 of the lock-casing 69, the pins 67 will be pushed out of the holes in the bar 39, thereby allowing a displacement of the latter and opening of the bag. To this end pins 68', corresponding in number and spacing to those of the plates 64, are arranged on the lower part of the box on the frame 7, Figs. 1, 2, 3, 10, 11, 12. If now the collecting-bag, Fig. 16, is hooked, by means of the openings 68 of the lock-casing 69, onto these pins, the pins 67 will be raised out of the holes in the bar 39 and release the latter, so that this bar can now be moved forward beneath the frame 7, thereby opening the bag, which is now capable of receiving the letters falling through the bottom of the box, which is simultaneously opened. When the frame 37 39 is drawn back by means of its handle 40, the bar 39, as already described, effects the closing of the box, Fig. 11. The detachment of the collecting-bag from the pins 68' can only be effected after the bar 39 has returned to its initial position, Figs. 16, 17, whereupon it effects the automatic closing of the bag. In order to open the collecting-bag for the discharge of the letters, a key, kept at the post-office, is provided, as shown in perspective view in Fig. 19, and in principle corresponds to the part of the box which effects the opening of the bag. This key is also provided with pins 68' for raising the plates 64 and with lateral bars 70 for guiding the key in the grooves 63 of the bar 37. The movement is effected by means of a handle 71.

It can be seen that the opening of the bag is only possible upon the opening of all the plates 64, of which seven are shown in the drawings, while the opening is not possible even while only one of these plates remains unraised. Thus a perfect safety is attained against opening of the box by unauthorized persons.

The space necessary for the letters in the letter-box is preferably limited by four vertical or obliquely-arranged sheet-metal plates in order to prevent the letters from coming in contact with the lock mechanism. The peculiar shape of the bottom part 8 insures a complete emptying of the letter-box, as the box by the bar 39 is only affected by the latter striking during its backward motion against the beveled bottom part.

What we claim, and desire to secure by Letters Patent of the United States, is—

1. In apparatus for receiving and collecting mail, the combination with a letter-box comprising two hinged, overlapping bottom sections, connections between said sections whereby the closing of one forces the closing of the other, and an automatic lock for holding said sections closed, of a mail-bag comprising a key to open said lock, guides engaging flanges at the foot of said box, a bar adapted to slide behind the rearmost bottom section as the latter opens and to bear against and close it and its companion section as the bag is closed and detached from the box.

2. In apparatus for receiving and collecting mail, the combination with a collecting-bag comprising guides to engage flanges at the sides of the mail-box, an automatic lock, a key to open a lock on the mail-box, a bar to engage the front of the box and another bar adapted to be moved to the rear of said box, of a mail-box comprising two hinged overlapping bottom sections, connections between said sections whereby the closing of one forces the closing of the other, a key adapted to unlock the mail-bag as the latter is applied thereto, and an automatic lock arranged to be opened by the key on the mail-bag as the rear bar thereof is slid to the rear of the box, whereby the hinged bottom sections are opened within the mouth of said bag and are closed by the sliding contact of the rear bar thereof as said mouth is closed.

3. In apparatus for receiving and collecting mail the combination with a mail-box comprising two hinged, overlapping bottom sections, and a pair of automatic locks therefor, each consisting of a horizontally-sliding bolt, flanged and slotted at each end, a vertically-sliding member having a lateral lug engaging with the flange at one end of said bolt and capable of passing through the slot thereof, a pivoted detent the point of which engages against the flange at the other end of said bolt and is capable of passing through the slot, and a pivoted spring-pressed latch arranged to engage and secure the underlapping member of the hinged bottom sections, and to be disengaged therefrom by a lug projecting from the bolt, of a sliding key adapted to engage successively a lug projecting from the foot of the vertically-sliding member to lift and hold the first-named lug in alinement with the slot through the adjacent flange of the bolt, a lug projecting from the detent, to lift the point of the latter into alinement with the slot through the flange adjacent thereto, and finally a lug projecting from the bolt, to throw the latter and disengage the latch.

4. In a safety letter-box having a hinged bottom adapted to be unlocked and opened by the attachment of a mail-bag to the foot of said box, the combination with said hinged bottom of a frame for the reception of a check-card, a hinged finger guided to press the check-card against said frame, a rod having a shouldered lower end, and to which said finger is hinged, and guides for said rod which stop its lower end in position to be struck and lifted by the hinged bottom as the latter is closed, whereby the card is held in its frame so long as the box is closed.

5. In a safety letter-box the bottom of which is composed of two overlapping hinged sections adapted to be unlocked by the attachment of a collecting-bag to the foot of said box, the combination with said sections of standards 44, 45 on the respective sections, a link connecting said standards and having a lateral lug, and a stop upon the adjacent wall or frame against which said lug strikes to stay the sections in a position wherein they will be closed by the closing of the bag.

6. In apparatus for receiving and collecting mail, the combination with a letter-box comprising two hinged bottom sections, automatic locks therefor having tumbler and throwing lugs projecting through the sides of the box near its foot, flanges extending beneath said lugs, and a key upon its front lower edge, of a collecting-bag comprising a mouth-frame composed of two parallel side bars adapted to engage and slide over said side flanges, a cross-bar connecting the forward ends of said parallel bars and constituting one longer side of the mouth, a handle connecting the other ends of the parallel bars and with said cross-bar spacing them to engage the aforesaid flanges, guideways along the inner sides of said parallel bars in which slides a second cross-bar constituting the other longer side of the mouth, an automatic lock uniting the first cross-bar to the second and unlocked by the key on the box, rods arranged longitudinally on the inner sides of the parallel bars, and rings sliding thereon and connecting the shorter sides of the mouth thereto, and keys upon the parallel bars adapted to operate the tumbler and throwing lugs of the box-locks, the arrangement being such that when the second cross-bar is hung upon the front lower edges the key on said edge unlocks the first cross-bar from the second, the side bars engage with the side flanges of the box and unlock the hinged bottom sections thereof as they are slid therealong, carrying with them the first cross-bar.

7. The combination with the series of fingers on the front lower edge of the letter-box, of the series of similarly-spaced locking-bolts passing through apertures in the rear transverse bar of the bag-frame and connecting it to the front thereof, whereby when said apertures are caused to register with the fingers and the weight of the bag rested thereon, the bolts are drawn and the front bar unlocked from the rear bar.

8. The combination with the series of fingers on the front lower edge of the letter-box, of the series of similarly-spaced locking-bolts passing through apertures in the rear transverse bar of the bag-frame, arms independently pivoted to the front bar of said frame and carrying said bolts and springs constantly pressing said arms in a direction to cause the engagement of said bolts, whereby when the said apertures are caused to register with the fingers and the weight of the bag rested thereon, the bolts are thrown back by the action of all of the fingers, and when the bag is lifted therefrom the bolts are immediately shot, locking said bag.

In testimony whereof we affix our signatures in presence of two witnesses.

FRANZ MARX.
EMIL MÉREI.

Witnesses:
JOSEPH WIRKMANN,
ODÖN MOHRIAZ.